Figure 1:
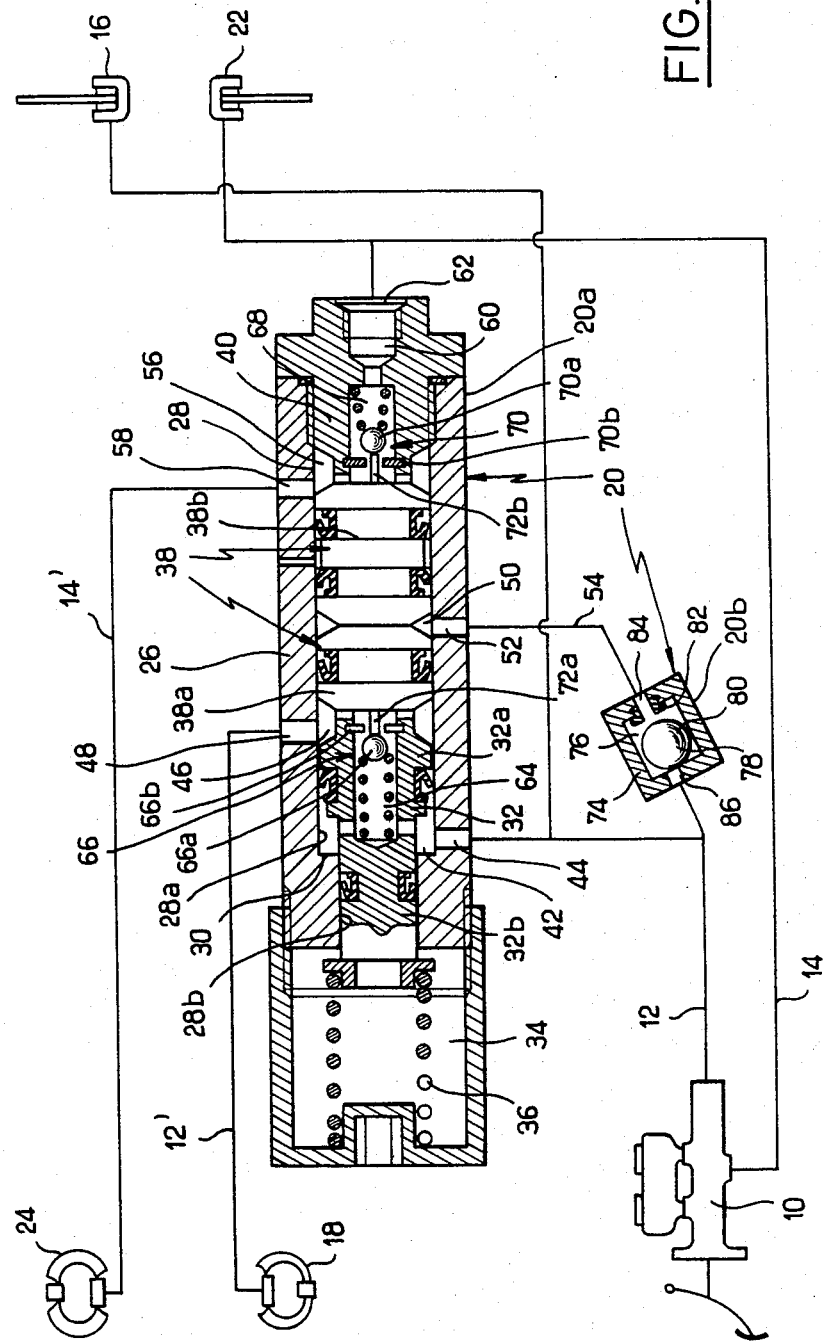

United States Patent [19]

Carré

[11] Patent Number: 4,516,810
[45] Date of Patent: May 14, 1985

[54] DUAL-CIRCUIT BRAKE CORRECTOR UNDER DECELERATION CONTROL

[75] Inventor: Jean-Jacques Carré, Le Raincy, France

[73] Assignee: Societe Anonyme D.B.A., Paris, France

[21] Appl. No.: 550,426

[22] Filed: Nov. 10, 1983

[30] Foreign Application Priority Data

Nov. 23, 1982 [FR] France .................. 82 19573

[51] Int. Cl.³ .............................................. B60T 8/14
[52] U.S. Cl. ................................................ 303/24 F
[58] Field of Search .............. 188/349; 303/6 C, 6 R, 303/24 A, 24 C, 24 F, 84 R, 84 A

[56] References Cited

U.S. PATENT DOCUMENTS

| 3,787,096 | 1/1974 | Shellhause | 303/24 F |
| 4,198,099 | 4/1980 | Oberthür | 303/6 C |
| 4,220,375 | 9/1980 | Burgdorf et al. | 303/6 C |

FOREIGN PATENT DOCUMENTS

| 2258991 | 8/1975 | France . | |
| 2421770 | 11/1979 | France . | |
| 2428553 | 1/1980 | France . | |
| 2437962 | 4/1980 | France . | |
| 2003240 | 3/1979 | United Kingdom . | |

*Primary Examiner*—Duane A. Reger
*Attorney, Agent, or Firm*—Larry J. Palguta; Ken C. Decker

[57] ABSTRACT

A brake corrector (20a) comprising a housing (26) having a bore (28) therein in which a stepped corrector piston (32) and a control piston (38) slide. A first corrector valve (66), controlled both by the corrector piston and by the control piston, and a second corrector valve (70), mounted fixed in the housing and controlled by the control piston, regulate the flow of fluid between a pressure generator of the tandem type (10) and two rear-brake motors of a vehicle (18, 24). The control piston (38) comprises two adjacent parts (38a, 38b) which define a control chamber (50) between them, the latter being connected to the pressure generator (10) via an isolating valve (20b) controlled as a function of the deceleration of the vehicle.

5 Claims, 4 Drawing Figures

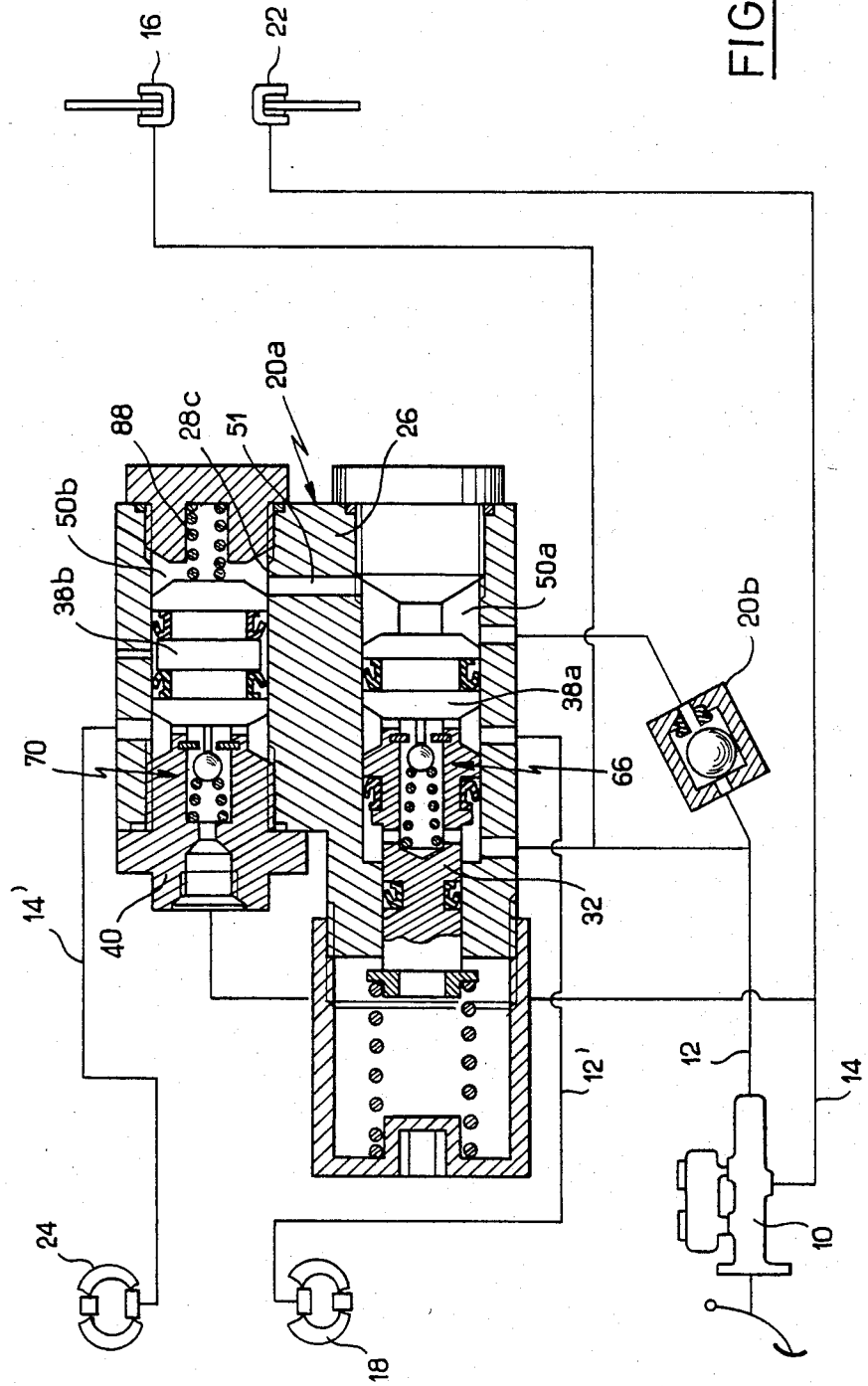
FIG._2

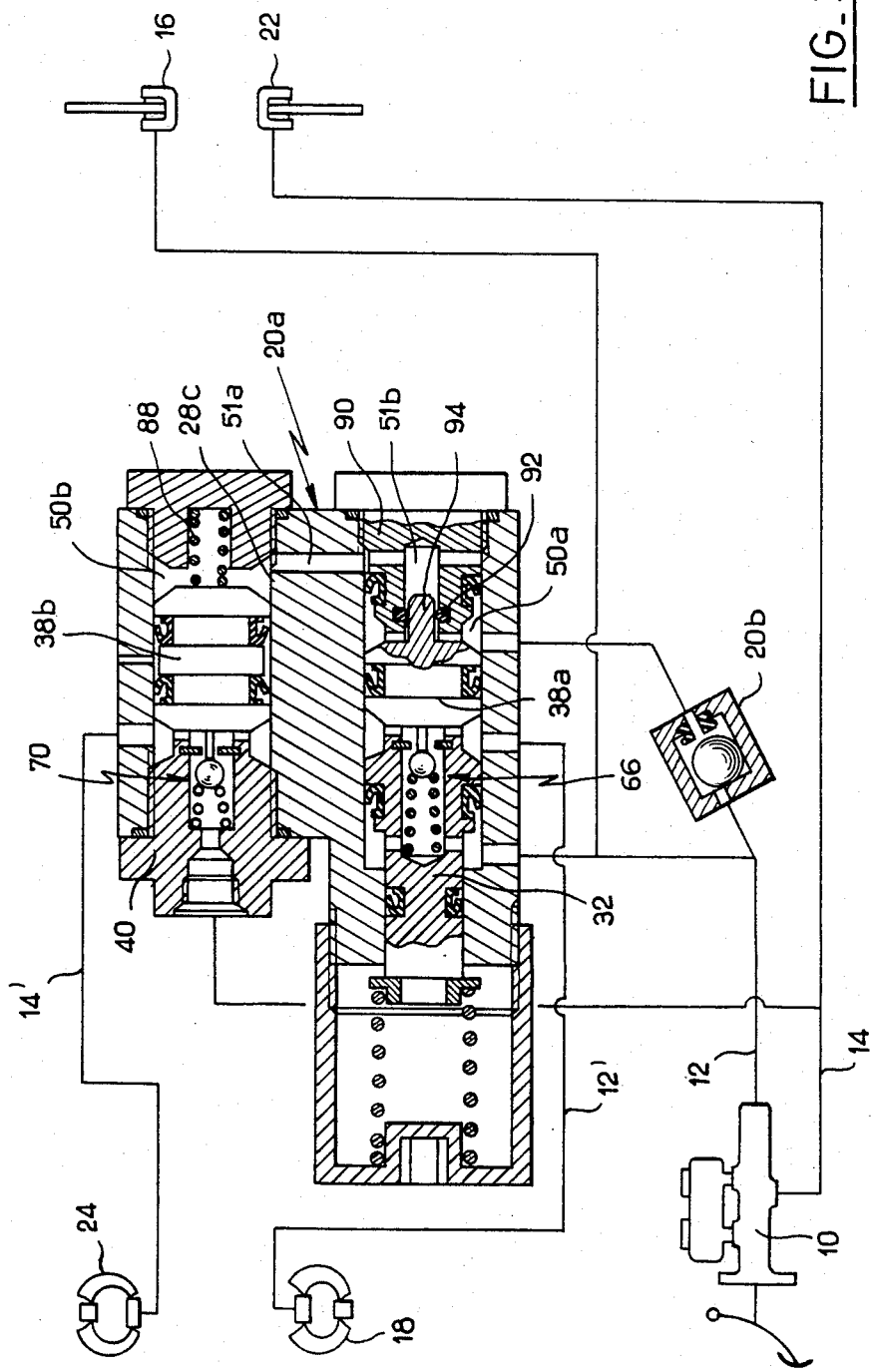
FIG_3

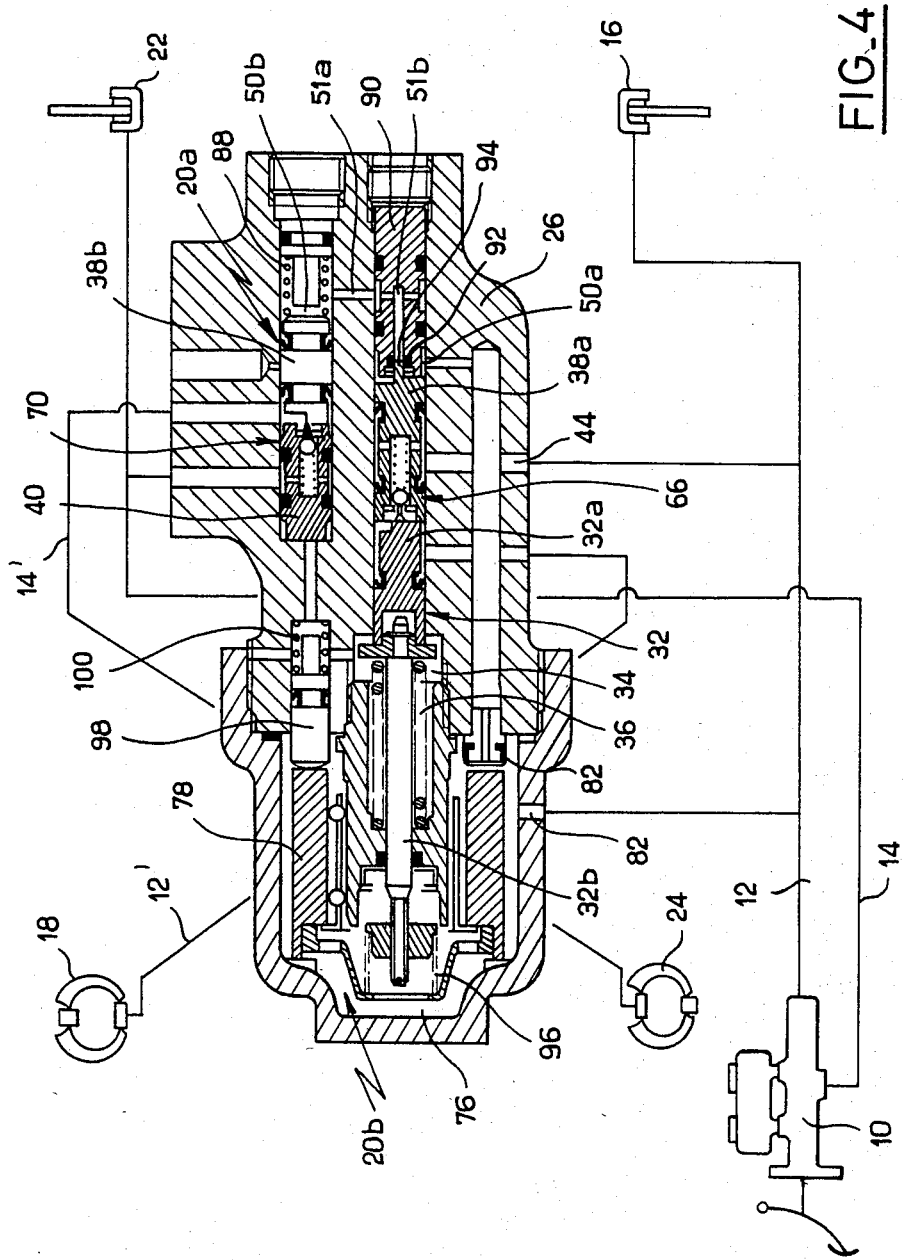
FIG_4

DUAL-CIRCUIT BRAKE CORRECTOR UNDER DECELERATION CONTROL

The invention relates to dual-circuit brake correctors under the control of the deceleration of the vehicle on which they are installed.

German Offenlegungsschrift No. 2,236,294 describes a dual-circuit corrector comprising a housing perforated with a bore in which a differential piston and a control piston are mounted, a first corrector valve being controlled both by the differential piston and by the control piston, and a second corrector valve, mounted fixed in the housing, being controlled by the control piston, a control force, applied to the differential piston, forcing the latter into contact with the control piston and the control piston into contact with the housing in a rest position in which the two corrector valves are open.

According to a first characteristic of the present invention, a corrector of this type is under the control of the deceleration of the vehicle by means of an isolating valve known per se, which is controlled by means of an inertial mass as a result of the following arrangement: the said control piston is made in two adjacent parts which define a control chamber between them, the said isolating valve being located on a pipe ending in the said control chamber.

According to another characteristic of the invention, the said control chamber is divided into two compartments by a passage connecting the said compartments, a safety valve being mounted in the said passage and being controlled by that one of the two parts of the control piston which interacts with the first corrector valve, the said safety valve being closed when the pistons are in their rest positions.

The details and advantages of the invention will emerge more clearly from a reading of the following description which refers to the attached drawings, in which:

FIG. 1 is a diagrammatic representation of a brake system incorporating a corrector according to the invention, shown in axial section, FIG. 2 shows an alternative form of the corrector of FIG. 1, likewise in axial section, FIG. 3 shows a second alternative form of the corrector of FIG. 1, in axial section, and FIG. 4 shows a third alternative form of the corrector of FIG. 1, also in axial section.

The brake system of FIG. 1 incorporates a master cylinder 10, also called a pressure generator of the tandem type, which delivers fluid under pressure into two pipes 12 and 14.

The first pipe 12 is connected directly to a front-wheel brake 16 located on the left-hand side of the vehicle, and is also connected to a rear-wheel brake 18 located on the right-hand side of the vehicle, via a pressure corrector assembly 20 which is the subject of the present invention.

The second pipe 14 is connected directly to a right front-wheel brake 22 and is connected to a lift rear-wheel brake 24, likewise via the corrector assembly 20.

The corrector assembly 20 consists of two parts: a part forming the actual corrector 20a and a part forming a decelerometric isolating valve 20b.

The part forming the corrector comprises a housing 26 having a stepped bore 28 therein and consisting of a portion of large diameter 28a and a portion of small diameter 28b, which are separated by a shoulder 30. A stepped corrector piston 32, consisting of a head 32a and a tail 32b, slides in a fluid-tight manner in the two bore parts 28a and 28b, the tail of the piston projecting on the outside into a chamber 34 subject to atmospheric pressure and accommodating a spring 36 which forces the piston 32 away from the shoulder 30 towards a rest position as will be seen later.

Mounted so as to slide in the bore 28a, and aligned with the corrector piston, is a control piston 38 which is made in two parts, one part 38a being adjacent to the stepped piston 32 and one part 38b being opposite. A closure member 40 is located in the bore 28a at the same end as the part 38b of the control piston.

The pistons mentioned above define a certain number of chambers in the bore 28:

a first inlet chamber 42 between the head and the tail of the stepped piston 32, which chamber is connected to the first pipe 12 via a first inlet orifice 44, a first outlet chamber 46 between the head of the stepped piston and the first control piston part 38a, which chamber is connected to the right rear-wheel brake 18 via a first outlet orifice 48 and a pipe 12′, a control chamber 50 between the two parts 38a and 38b of the control piston, which chamber is connected to the part forming the isolating valve 20b via a control orifice 52 and a pipe 54, a second outlet chamber 56 between the second control piston part 38b and the closure member 40, which chamber is connected to the left rear-wheel brake 24 via a second outlet orifice 58 and a pipe 14′, and a second inlet chamber 60, which is defined in the closure member 40 and which is connected to the second pipe 14 via a second inlet orifice 62.

The stepped piston 32 incorporates a passage 64 between the first inlet and outlet chambers 42 and 46, and mounted in this passage is a first corrector valve 66, the valve member 66a of which is located on the same side as the first inlet chamber 42 and is forced elastically towards a seat 66b.

The closure member 40 likewise incorporates a passage 68 between the second inlet and outlet chambers 60 and 56, and mounted in this passage is a second corrector valve 70, the valve member 70a of which is located on the same side as the second inlet chamber 60 and is forced elastically towards a seat 70b.

The two control piston parts 38a and 38b each carry a valve stem 72a, 72b, and these project axially in the direction of the valve members 66a and 70a passing through the seats 66b and 70b.

In the absence of any pressure in the chambers and pipes mentioned above, the spring 36 pushes the piston 32 up against the control-piston part 38a, the latter in turn up against the second part 38b, and this second part up against the closure member 40, thus defining the rest position of the assembly.

In this position, the valve stem 72a and 72b keep the valve members 66a and 70a free of their seats.

The part forming the isolating valve 20b comprises a body 74, within which is defined a cavity 76 accommodating an inertial mass 78 which is capable of moving along an inclined plate 80 when deceleration exceeds a predetermined value, so as to shut off a valve seat 82 located at the mouth of an outlet orifice 84.

The part forming the isolating valve 20b also incorporates an inlet orifice 86 connected to the first pipe 12, and its outlet orifice 84 is connected to the control orifice 52 of the part forming the corrector 20a via the pipe 54.

During braking, the system described operates as follows:

During a first phase, as long as the deceleration remains below the predetermined threshold, the mass 78 remains motionless at the bottom of the inclined plane 80 and at a distance from the seat 82, thus establishing free communication between the pipe 12 and the control chamber 50.

It is easy to see that the outlet pressures, that is to say the pressures which prevail in the outlet chambers 46 and 56 and which are transmitted to the rear brakes, remain equal to the inlet pressures, that is to say the pressures generated in the pipes 12 and 14 as a result of actuation of the master cylinder 10.

This equality remains assured even when the piston 32 is displaced against the spring 36 when the inlet pressure in the chamber 42 exceeds a predetermined value. In fact, during such displacement, the stepped piston 32 moves away from the part 38a of the control piston, thus causing the valve 66 to close. Because of this closure, the pressure in the outlet chamber 46 remains constant, and any increase in the inlet pressure, both in the inlet chamber 42 and in the control chamber 50, causes the stepped piston 32 and the control piston part 38a to approach one another again, thereby causing the valve 66 to re-open.

As regards the valve 70, it will be noted that as long as the inlet pressures prevailing in the pipes 12 and 14 are equal, the second control-piston part 38b remains motionless, and the valve 70 consequently remains open.

During the foregoing process, it will be noted that as the piston 32 is displaced against the spring 36 so the control piston part 38a is displaced proportionally together with the stepped piston 32 and moves away from the second part 38b.

During a second braking phase, when the deceleration exceeds a predetermined threshold, the mass 78 moves along the inclined plane 80 and shuts off the seat 82. Communication between the pipe 12 and the control chamber 50 is interrupted. The volume of the control chamber 50 can no longer vary, and the two control-piston parts 38a and 38b can no longer be displaced independently of one another, and they behave as a single unit.

From this moment, the outlet pressures in the pipes 12' and 14' undergo an increase less than the increase in the inlet pressures in the pipes 12 and 14, in the ratio of the cross-sections of the tail and head of the stepped piston 32, as explained in more detail in the document No. DE-A-2 236 294 already mentioned, to which reference may advantageously be made.

In the alternative embodiment shown in FIG. 2, where the reference symbols for identical elements are the same as in FIG. 1, the second control-piston part 38b and the closure member 40 are mounted in an additional bore 28c, the control chamber 50 then being divided into two sub-chambers: 50a in the bore 28a and 50b in the bore 28c, these being connected by a channel 51. For the purpose of keeping the valve 70 in the open rest position a light-weight spring 88 pushes the control-piston part 38b up against the closure member.

This device functions in an identical way to the device shown in FIG. 1.

In both cases, when there is a failure of one or other of the brake circuits, operation is modified as follows:

(a) failure of the circuit supplied via the pipe 12, which results in an absence of pressure in the chambers 42, 46 and 50; when the pressure in the second outlet chamber 56 reaches a given value, the pistons 32, 38a and 38b are displaced together against the spring 36, and the valve 70 closes. The pressure admitted to the left rear brake 24 will therefore remain limited to this given value.

(b) failure of the circuit supplied via the pipe 14, which results in an absence of pressure in the chambers 60 and 56; the inlet and outlet pressures will remain equal as long as the deceleration has not reached the predetermined value already mentioned, and this will make it necessary to reach distinctly higher pressures because the brakes 22 and 24 are not actuated. If the deceleration reaches this value, the outlet pressure transmitted to the brake 18 will have an increase less than the increase in the inlet pressure coming from the pipe 12, as already explained, since the control-piston part 38a remains locked in the position reached as a result of the isolation of the control chamber 50.

A further embodiment shown in FIG. 3, where identical elements are denoted by the same reference symbols, has the following differences as compared with the embodiment shown in FIG. 2: the channel 51 comprises a first part 51a in the housing 26 and a second part 51b provided axially in an additional closure member 90 which is fastened in the bore 28a in a position opposite the first control-piston part 38a. Located at the mouth of the channel part 51b is an annular gasket 92 forming a safety valve, and the control-piston part 38a has an axial extension 94 which passes through the valve gasket 92 in a fluid-tight manner. As illustrated, the control orifice opens only into the sub-chamber 50a of the control chamber. This modification does not influence the normal operation of the system, since when the two pipes 12 and 14 are put under pressure simultaneously, equal pressures are established in the subchambers 50a and 50b of the control chamber 50.

Before the control chamber 50 is isolated as a result of the closure of the part forming the isolating valve 20b, the control-piston part 38a is displaced together with the stepped piston 32, and the axial extension 94 disengages from the valve gasket 92 so as to restore the continuity of the control chamber 50. After the control chamber 50 has been isolated, the two control-piston parts 38a and 38b are displaced as though they form a single unit, as already explained.

In contrast to this, the behaviour in the event of failure is modified in the following way:

(a) failure of the circuit supplied via the pipe 12: because of the absence of pressure in the chambers 42, 46 and 50, the control-piston part 38a remains motionless and the axial extension 94 remains engaged in the valve gasket 92. Since the sub-chamber 50b is isolated, the second control-piston part 38b cannot be displaced away from the closure member 40, with the result that the valve 70 is maintained in its open position. The outlet pressure admitted to the brake 24 remains under all circumstances equal to the inlet pressure supplied via the pipe 14.

(b) failure of the circuit supplied via the pipe 14: the behaviour is identical to that of the preceding embodiments.

FIG. 4 illustrates a further embodiment similar to that shown in FIG. 3, in which the part forming the isolating valve 20b is integral with the same housing 26 as the part forming the corrector 20a, identical elements still being denoted by the same reference symbols.

It will be noted that the arrangement "inertial mass 78 moving along an inclined plane 80" has been replaced there by an arrangement "inertial mass 78 moving against, a spring 96".

This embodiment is similar to the device described in French Patent Application No. A 2,502,087 to which reference may advantageously be made, especially as regards the arrangement according to which the stepped piston 32 modifies the calibration of the restoring spring 96 for the inertial mass, so that the predetermined deceleration at which the mass moves to close the seat 82 is made variable as a function of the brake pressure.

Other supplementary arrangements will also be noted, and among these are the following:

a return piston 98, loaded by a spring 100, ensures the return of the mass 78 into its position free of the seat 82 when the pressure is relieved.

the tail of the stepped piston 32 passes through the atmospheric chamber 34 and projects into the cavity 76 of the part forming a decelerometer 20b.

the valve 66 is mounted in the control-piston part 38a, and the position of the first inlet and outlet chambers 42 and 46 is reversed.

although the connection of the cavity 76 to the pipe 12 has been represented by an external pipe, it is also possible advantageously to provide a channel which is located inside the housing 26 and which opens into the orifice 44, in the manner of the device shown in French Patent Application No. A 2,502,087 already mentioned.

I claim:

1. Dual-circuit brake corrector under deceleration control for the brake system of a vehicle, comprising a housing (26) having a bore (28) therein, having two parts of large and small diameter (28a, 28b) respectively, a stepped corrector piston (32) having a head (32a) and a tail (32b) sliding respectively in the parts of large and small diameter (28), a control piston (38) adjacent to the head (32a) of the stepped piston and likewise sliding in the part of large diameter (28a) of the bore, and a closure member (40) closing the bore (28) in a position opposite the control piston, a spring (36) bearing on the tail (32b) of the stepped piston and urging the latter up against the control piston (38) and the control piston up against the said closure member (40), thus defining the rest position of the said pistons, a first inlet chamber (42) defined between the said stepped piston (32) and the said bore (28a), a first outlet chamber (46) defined between the piston head (32a) and the control piston (38), a second outlet chamber (56) between the control piston (38) and the closure member (40), and a second inlet chamber (60) defined in the said closure member (40), the said inlet chambers being intended to be connected to the two outlets of a pressure generator of the tandem type (10), and the said outlet chambers being intended to be connected to rear brakes (18, 24) on each side of the vehicle, a first passage (64) between the first inlet chamber (42) and first outlet chamber (46), a second passage (68) between the second inlet chamber (60) and second outlet chamber (56), a first and a second corrector valve (66, 70) in the said passages, the first (66) being controlled both by the said stepped piston (32) and by the said control piston (38), and the second (70) being controlled by the said control piston (38), characterized in that the said control piston (38) is made in two adjacent parts (38a, 38b) which define a control chamber (50) between them, the latter being connected to the first inlet chamber (42) via an isolating valve (20b) known per se, which is controlled by an inertial mass (78) sensitive to the deceleration of the said vehicle.

2. Brake corrector according to claim 1, characterized in that the said housing incorporates an additional bore (28c) in which the second control piston part (38b) and the said closure member (40) are mounted, the said control chamber (50) being divided into two sub-chambers, namely one (50a) in the bore (28a) and the other in the additional bore (28c), which communicate via a channel (51), the said control orifice (52) opening into the first sub-chamber (50a).

3. Brake corrector according to claim 2, characterized in that it incorporates a spring (88) which pushes the control piston part (38b) up against the closure member (40).

4. Corrector according to claim 3, characterized in that the said channel (51) comprises a first part (51a) in the housing (26) and a second part (51b) in an additional closure member (90) fastened in the bore (28a) in a position opposite the first control piston part (38a), this second channel part (51b) accommodating an annular valve gasket (92), and the said control piston part (38a) incorporating an axial extension (94) interacting with the said valve gasket (92) to form a safety valve isolating the two control sub-chambers (51a, 51b) at rest.

5. Corrector according to claim 1, characterized in that the said isolating valve (20b) is accommodated in the same housing (26).

* * * * *